US008180479B2

(12) United States Patent
Xu et al.

(10) Patent No.: US 8,180,479 B2
(45) Date of Patent: May 15, 2012

(54) ADAPTIVE CONTROL OF COMPOSITE PLYCUTTING

(75) Inventors: Liangji Xu, Kent, WA (US); Stephen Halladin, Renton, WA (US); Robert A. Kramp, Jr., Bonney Lake, WA (US)

(73) Assignee: The Boeing Company, Chicago, IL (US)

( * ) Notice: Subject to any disclaimer, the term of this patent is extended or adjusted under 35 U.S.C. 154(b) by 283 days.

(21) Appl. No.: 12/025,899

(22) Filed: Feb. 5, 2008

(65) Prior Publication Data

US 2009/0198369 A1 Aug. 6, 2009

(51) Int. Cl.
*G06F 19/00* (2011.01)

(52) U.S. Cl. ......... 700/173; 700/160; 700/170; 700/175

(58) Field of Classification Search .................. 700/173, 700/160, 170, 175, 190
See application file for complete search history.

(56) References Cited

U.S. PATENT DOCUMENTS

| | | | | | |
|---|---|---|---|---|---|
| 4,698,773 | A | * | 10/1987 | Jeppsson | 700/160 |
| 4,787,049 | A | | 11/1988 | Hirata | |
| 5,662,566 | A | * | 9/1997 | Marxrieser et al. | 483/1 |
| 2006/0260751 | A1 | * | 11/2006 | Lauder et al. | 156/382 |
| 2007/0196540 | A1 | * | 8/2007 | Kirksey et al. | 426/94 |
| 2010/0084087 | A1 | * | 4/2010 | McCowin et al. | 156/267 |

OTHER PUBLICATIONS

Jan Jeppsson, Adaptive Control of Milling Machines, SME Technical Paper, 1988, MS88-103, Society of Manufacturing Engineers, Dearborn, MI 48121.

* cited by examiner

*Primary Examiner* — Kakali Chaki
*Assistant Examiner* — Nathan Laughlin
(74) *Attorney, Agent, or Firm* — Yee & Associates, P.C.

(57) ABSTRACT

The feed rate of an ultrasonic knife used to cut composite material is optimized using adaptive control. One or more parameters such as ultrasonic power or side load on the knife is sensed and used to generate feedback control signals. The feedback control signals are used to optimize the commanded feedrate of the knife.

25 Claims, 4 Drawing Sheets

ADAPTIVE CONTROL OF COMPOSITE PLYCUTTING

TECHNICAL FIELD

This disclosure generally relates to automatically controlled machine tools, and deals more particularly with a system and method for automatically controlling the feed rate of an ultrasonic knife used to cut material, especially multiple plies of composite material.

BACKGROUND

Ultrasonic cutters are currently used to cut sheet and other materials using a knife powered by an ultrasonic transducer. One application of ultrasonic cutters may be found in the field of composite materials where multiple layers or plies of uncured composite material forming a lay-up may be simultaneously cut to a desired shape using an ultrasonically powered knife. In some cases, the ultrasonic cutter may be mounted on a CNC (computer numerical control) controlled machine tool that includes an automatic tape laying head capable of laying down and cutting multiple, overlapping layers of composite tape.

The process of cutting the composite material is relatively slow in comparison to the rate at which the tape may be applied. The speed of the cutting process may be determined, in part, by the maximum feed rate of the knife through the material and depth of cut. Thicker parts require multiple passes in order to fully cut through all plies of material, with each pass of the cutter being deeper than the last. Currently, an open-loop ply cutting process is used that requires constant operator monitoring and manual adjustment of the feed rate override dial, which may result in suboptimal cutting operations, including suboptimal cutting speed. Knife feed rates are manually adjusted by an operator during cutting based on observed fluctuations in the ultrasonic power meter. Perceived “safe” power levels are maintained by overriding the programmed feed rate, which may result in cutting times that are less than optimal. Moreover, operators may not be able to detect transient or peak load conditions and react quickly enough to decrease feed rates before possible knife malfunction occurs. In some cases, excessive feed rates may also result in suboptimal cutter operation.

The prior art includes an adaptive control apparatus having a load detector that detects a load which acts on a cutting tool during a machining operation of a workpiece. Such adaptive control techniques have not, however, been applied to CNC ultrasonic cutters used to cut multiple plies of composite material.

Accordingly, there is a need for a method and system for cutting plies of composite material using a CNC controlled ultrasonic cutter that employs adaptive control in order to optimize feed rate and/or reduce knife damage and cutting errors.

SUMMARY

In accordance with the disclosed embodiments, a method and system are provided for cutting composite plies using an automatically controlled ultrasonic cutter and adaptive control to optimize the feed rate. Feed rates are adjusted to optimal levels based on knife condition in order maximize productivity. A parameter related to cutting, such as knife load is measured and is used to produce a feedback signal that is used to adjust the feed rate without human intervention. The feed rate is quickly adjusted when knife and/or ply material conditions change, such as knife sharpness, number of plies, depth of cut, angle of cut in relation to ply fiber direction, thickness of the plies, tackiness of material, compaction force used during layup, and ply toughness, or unpredicted events occur such as knife breakage. Automatic adjustment of feed rates result in a high average feed rate to maximize productivity, while relieving the operator of the need to constantly monitoring knife load and manually overriding the feed rate. Finally, the amount of programming required to control the cutter may be reduced, because a relatively high constant feed rate can be programmed and then adaptively adjusted to actual cutting conditions.

According to one disclosed embodiment, a method is provided for cutting composite plies, comprising: feeding an ultrasonic knife through the plies; measuring a parameter related to the operation of the knife as the knife cuts the plies; and, generating a feed rate signal that optimizes the feed rate of the knife based on the measured parameter. The measured parameter may comprise one of the power load delivered to the ultrasonic transducer used to drive the knife, deflection of the knife and/or the temperature of the knife. The method may further comprise feeding back the measured parameter to a controller and using the controller to generate the feed rate signal. The method may also include comparing the value of the measured parameter with a pre-selected value, and generating the feed rate signal based on the results of the comparison.

According to another disclosed embodiment, a method is provided for controlling the operation of an ultrasonic cutter, comprising: selecting a feed rate at which an ultrasonic knife is fed to cut material; measuring at least one parameter related to the operation of the knife as the knife cuts the material; comparing the value of the measured parameter with a pre-selected value; and, determining whether to adjust selected feed rate based on the results of the comparison. Determining whether to adjust the feed rate may be performed by an automatic controller and the method may further include feeding back the measured parameter to the controller. Measuring the parameter may include measuring the power load used by the knife, and/or sensing either the deflection of the knife or the temperature of the knife. The method may further include controlling the movement of the knife using a first controller, and wherein comparing the measured parameter with a pre-selected value and adjusting the feed rate is performed by a second controller.

In accordance with a further embodiment, a system is provided for cutting composite material, comprising: an ultrasonic powered knife for cutting the material; control means for controlling the rate at which the knife is fed through the composite material; sensing means for sensing at least one parameter related to the operation of the knife; and, a set of programmed instructions used by the control means for optimizing the feed rate of the knife based on the sensed parameter. The sensing means may include a transducer for converting side loads on the knife into an electrical signal representing the measured parameter. The sensing means may also include a sensor for sensing ultrasonic power delivered to the knife. The control means may include a controller for generating a commanded feed rate control signal based on the sensed side loads on the knife and ultrasonic power load delivered to the knife. The control means may include a first controller for controlling the movement of the knife, and, a second controller for generating a control signal used by the first controller to optimize the feed rate of the knife.

In accordance with another embodiment, a system is provided for cutting composite material, comprising: an ultrasonic powered knife for cutting the material; means for feeding the knife through the composite material; means for producing a first signal related to ultrasonic power load delivered to the knife; means for producing a second signal related to a side load imposed on the knife by the composite material; means for generating a feedback control signal using the first and second signal; and, control means coupled with the feeding means for optimizing the rate at which the knife is fed through the composite material based on the feedback signal. The means for producing the first signal may include a sensor for sensing ultrasonic power used to drive the knife. The means for generating the feedback control signal may include a signal conditioner for combining the first and second signals, and the means for generating the feedback signal may include a controller running an adaptive control algorithm. The system may further comprise a set of programmed instructions and setup values used by the means for generating the feedback control signal.

The disclosed embodiments satisfy the need for a method and system for cutting composite plies using adaptive control to optimize feed rate, reduce machine downtime and minimize operator intervention and oversight.

Other features, benefits and advantages of the disclosed embodiments will become apparent from the following description of embodiments, when viewed in accordance with the attached drawings and appended claims

BRIEF DESCRIPTION OF THE ILLUSTRATIONS

DETAILED DESCRIPTION

Figure 1:
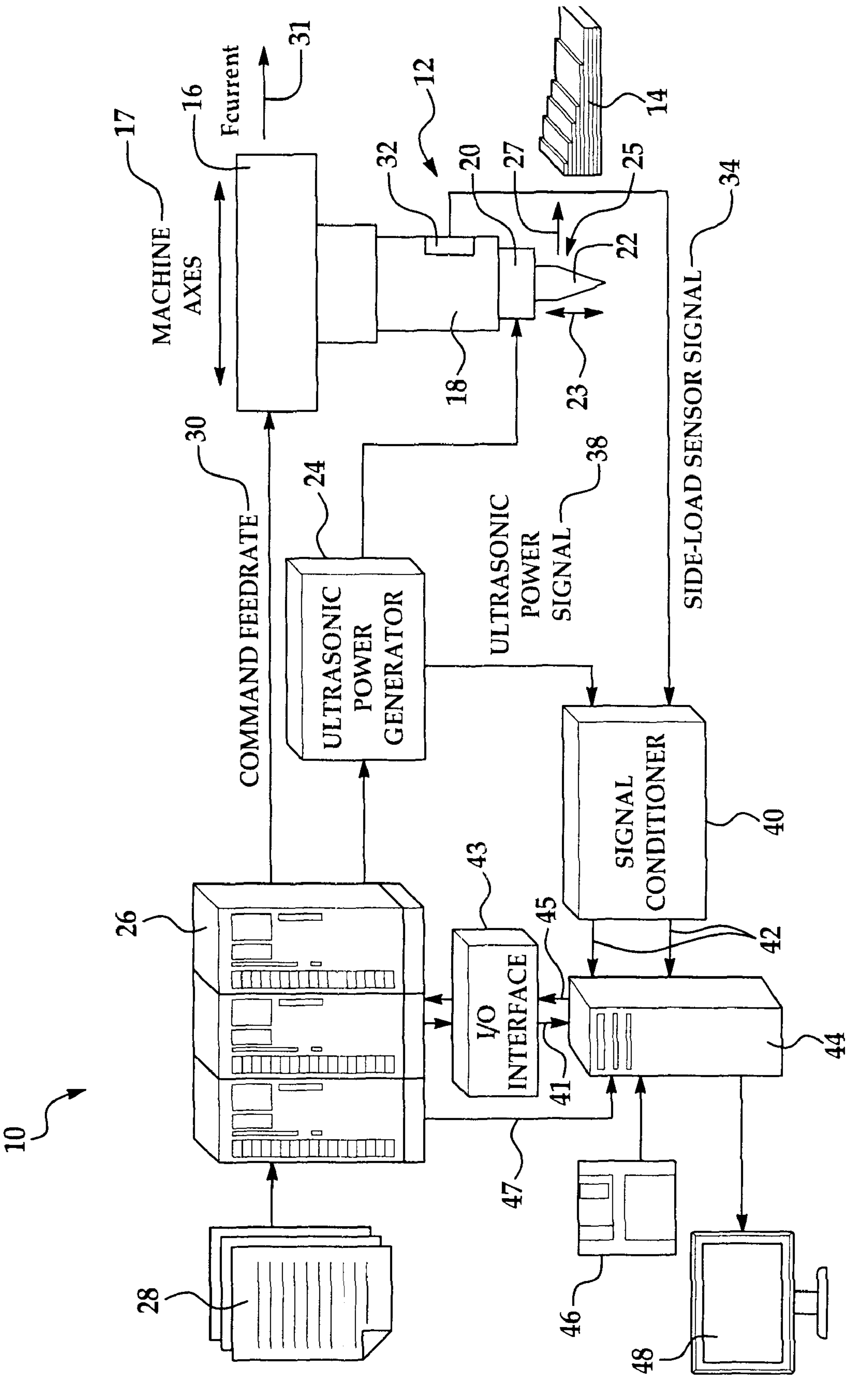
FIG. 1 is a combined block and diagrammatic illustration of a system for cutting composite plies.

Reference is first made to FIG. 1 which illustrates a system 10 for cutting multiple plies 14 of a composite material using an automatically controlled, ultrasonic cutter generally indicated by the numeral 12. Although multiple plies 14 of composite material are illustrated in connection with the disclosed embodiments, it is to be understood that a single ply of composite material may be cut, as well as materials other than composite materials. The plies may be green (uncured) where the cutter 12 is used to cut shapes of plies that are used to form a layup during the initial fabrication of a structure. However, embodiments of the disclosure may also be used to cut partially or fully cured plies after a structure has been fabricated, as during repairs on a composite aircraft assembly or subassembly, where a section of the assembly/subassembly must be cut out.

Figure 2:
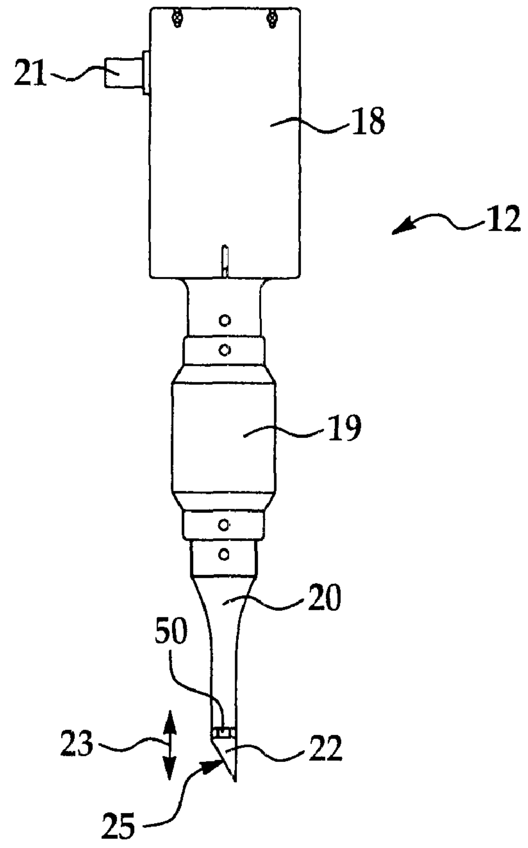
FIG. 2 is a side view of an ultrasonic cutter.

The ultrasonic cutter 12 is mounted on a toolhead 16 that may be moved along multiple machine axes 17 in order to follow a preprogrammed cutting path through the plies 14. Referring now also to FIG. 2, the ultrasonic cutter 12 includes a cutting knife 22 driven by an ultrasonic transducer 18 which is attached to the toolhead 16. The knife 22 reciprocates in the direction of the arrow 23 at ultrasonic frequencies. A forward cutting edge 25 on the knife 22 is fed into the plies 14 in the direction of feed 27 at a feed rate Fcurrent indicated by the numeral 31, such that the plane of the knife 22 is maintained generally perpendicular to the planes of the plies 14. The knife 22 may be attached by a releasable connection 50 (FIG. 2) to a horn 20 which focuses ultrasonic energy on the knife 22 and causes the knife 22 to reciprocate. The transducer 18 is energized through a connection 21 from an ultrasonic power generator 24. The transducer 18 then converts the energy into vibrations of very low amplitude. The amplitude of the vibrations can be amplified by a booster 19 before delivery to the horn 20 and knife 22. A closed-loop control maintains the amplitude by delivering more power to the transducer 18. Excessively high power levels may automatically shut down the cutting unit 12.

The movement (feed) and operation of the ultrasonic cutter 12 are controlled by an automatic controller 26 which may comprise for example, without limitation, a CNC (computer numerical control) controller that employs an NC (numerical control) program 28. The automatic controller 26 is programmed to control the movement of the ultrasonic cutter 12 in a path through the multiple plies 14 at a predetermined feed rate 31 represented by a commanded feed rate signal 30 issued by the automatic controller 26 to the ultrasonic cutter 12.

The value of the commanded feed rate signal 30 and thus, the actual feed rate 31 of the cutter 12, is the product of the programmed feed rate established by the NC program 28, and a "feed rate override" value. For example, if the programmed feed rate is 10 inch per minute, and the feed rate override valued is 80%, the actual feed rate 31 of the cutter 12 will be 10×80%=8 inch per minute. As will be discussed in more detail below, embodiments of the disclosure optimize the actual feed rate 31 of the cutter 12 using feedback signals to adjust the feed rate override value. As used herein, the terms "optimize" and "optimizing" the feed rate may include increasing or decreasing the feed rate, or stopping knife feed, as when the knife breaks or may be about to break.

The amount of ultrasonic power, i.e. power load delivered to the transducer 18 by the ultrasonic power generator 24 is monitored by the automatic controller 26. Generally, the ultrasonic power load required to drive the transducer 18 in order to obtain satisfactory ply cutting is proportional to the load imposed on the knife 22 by cutting of the plies 14; a greater number of plies 14 creates a higher load on the knife 22 that requires higher levels of power to drive the transducer 18. As stated previously, knife 22 and/or material conditions can also significantly affect power load levels.

In accordance with the disclosed embodiments, the rate at which the ultrasonic cutter 12 is fed through the plies 14 may be adjusted and optimized using feedback signals 42 that are used by the automatic 26 to adjust the commanded feed rate 30. The feedback signals 42 are generated using one or more measured parameters related to the operation of the knife 22. As will be described below, the ultrasonic power load delivered to the transducer 18 by the power generator 24 as well as a side load on the knife 22 may be used as measured parameters to generate the feedback signals 42. However, the use of other parameters as feedback signals may also be possible, such as without limitation, the temperature of the knife 22 and/or deflection of the knife 22.

The side load imposed on the knife 22 by the multiple plies 14 as they are cut is measured by a sensor 32 which may comprise, for example, and without limitation, a strain gauge or similar strain or force measuring device which converts the measured side load into a sensor signal 34 that is delivered to a signal conditioner 40. An ultrasonic power signal 38, proportional to the electrical power load delivered to the transducer 18, is also sent to the signal conditioner 40. The signal conditioner 40 may comprise any of various well known circuits, including for example and without limitation, amplifiers (not shown) and optical isolators (not shown) which function to condition signals 34, 38, so as to render them compatible for processing by an adaptive control computer 44.

The feedback signals 42 are combined and processed by the computer 44. The computer 44 also communicates with the automatic controller 26 to obtain the current feed rate override setting 41 through an I/O (input/output) interface 43. Stored setup parameters 46 for the computer 44 may be established through a user interface 48 in order to control the particular manner in which the computer 44 adjusts the current feed rate 31 override setting 41 based on the values of the feedback signals 42. Based on the setup parameters 46, instructions 47 from the executed NC program 28, the values of the current feed rate override setting 41 acquired from the automatic controller 26 and the feedback signals 42, computer 44 issues an optimized feed rate override signal 45 to the automatic controller 26 which results in an adjustment of the commanded feed rate 30 in order to optimize the feed rate 31 of the ultrasonic cutter 12.

In some applications, it may not be uncommon for the knife 22 to "stray" during the cutting process, particularly where the knife 22 has relatively low stiffness to resist side loading. Knife straying may increase side loads on the knife 22 and/or result in higher power consumption by the cutter 12. Similarly, when the knife 22 becomes dull and/or the material plies 14 become thicker or more numerous, the power consumed by the transducer 18 increases accordingly. In accordance with the disclosed embodiments, as this power consumption increases, the adaptive control computer 44 reduces the feed rate override value in order to maintain a predefined level of power consumption.

As discussed above, the disclosed embodiments adjust the feed rate 31 of the ultrasonic cutter 12 based on the condition of the knife 22 in order to maximize productivity. The side loads imposed on the knife are measured and the feed rate 31 is adjusted accordingly without the need for human intervention. In the event that an unpredicted event, such as a sudden increase of the cutting load at the knife 22, the adaptive control method of the embodiments may quickly terminate the cutting process in order to reduce the possibility of breakage of the knife 22 and/or damage to the part.

Figure 3:
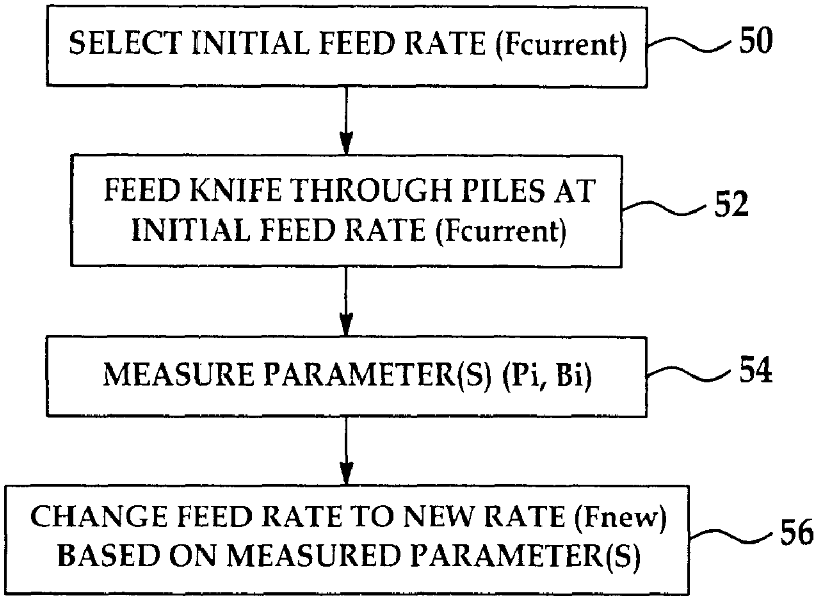
FIG. 3 is a block diagram broadly illustrating the steps of a method for cutting composite plies.

Attention is now directed to FIG. 3 which broadly depicts the overall steps of one method embodiment. Beginning at step 50, an initial feed rate Fcurrent 31 is selected, which may form part of the NC control program 28 (FIG. 1). Next, at step 52, the knife 22 is automatically fed through the multiple plies 14 at the initial feed rate Fcurrent 31. As the plies 14 are cut, one or more parameters are measured at step 54 which are related to operation of the knife 22. As previously mentioned, in the illustrated embodiment, the measured parameters comprise the power Pi used to drive the knife 22, and the side load Bi on the knife 22 resulting from the resistance presented by the plies 14. Finally, at 56, the initial feed rate 31 is changed to a new feed rate Fnew based on the measured parameters.

Figure 4:
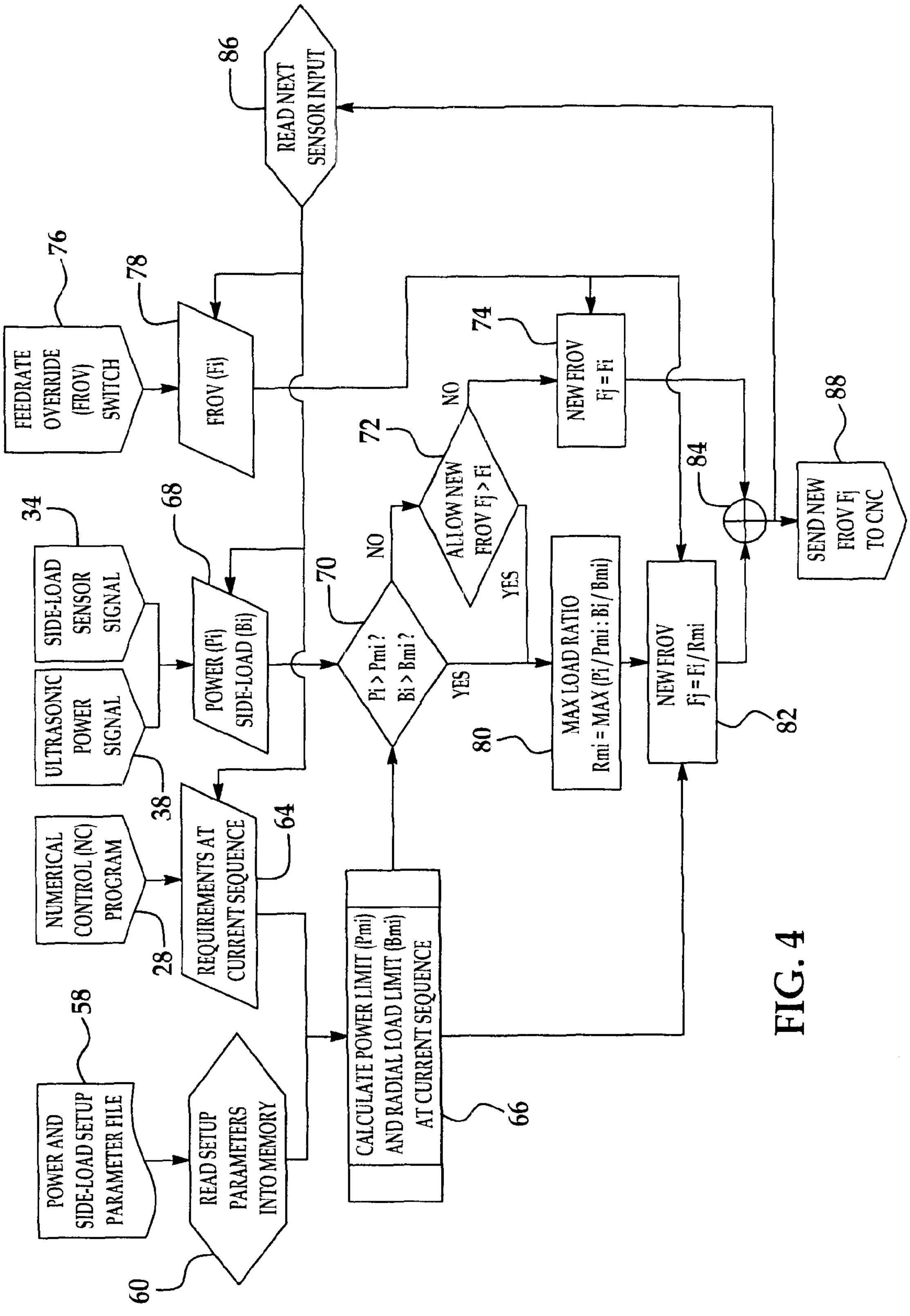
FIG. 4 is a more detailed flow diagram illustrating the method for cutting composite plies using adaptive control.

Details of another method embodiment are illustrated in FIG. 4. At 60, power and side load setup parameters are retrieved from a setup parameter file 58 and read into a memory (not shown). At 64, the requirements for controlling the knife 22 during the current cutting sequence is derived from the NC program 28. Using the setup parameters stored in memory at 60 and the requirements of the current cutting sequence derived at 64, a power limit (Pmi) and a radial load limit (Bmi) are each calculated for the current cutting sequence as shown at step 66. The side load sensor signal and the ultrasonic power signal 34, 38 respectively are received at 68. At step 70, a determination is made as to whether either Pi is greater than Pmi or Bi is greater than Bmi. If either of the calculated limits Pi, Bi exceeds the corresponding measured values Pmi, Bmi, then at step 80, a maximum load ratio Rmi is determined by the highest value between the two ratios Pi/Pmi and Bi/Bmi. Thus, Rmi can be described as follows:

$$Rmi=\mathrm{Max}(Pi/Pmi:Bi/Bmi)$$

If neither Pi nor Bi are determined to exceed the calculated limits at step 70, then the process moves to step 72 where a decision is made of whether to allow a new feed rate override value FROV Fi greater than the current feed rate Fi. If the decision is negative at 72, then the new feed rate override value FROV Fj is set equal to the current feed rate override Fi at step 74 and the resulting value is delivered to a summing point 84. However, if it is determined that the new feed rate override Fj may exceed the current feed rate Fi at 72, then the process proceeds to step 80 where the maximum load ratio Rmi is calculated as previously described. At step 82, a new feed rate override value Fj is calculated as follows:

$$Fj=Fi/Rmi$$

The values of Fi used at 74 and 82 are received from a feed rate override switch 76 located forming part of the automatic controller 26, which loads the current value of feed rate override Fi at 78. The new feed rate override Fj obtained at either step 74 or step 82 is delivered to the summing point 84. The new feed rate override Fj having been established, its value is sent to the automatic controller 26 as shown at the step 88, and the next set of sensor inputs are read at 86.

Figure 5:
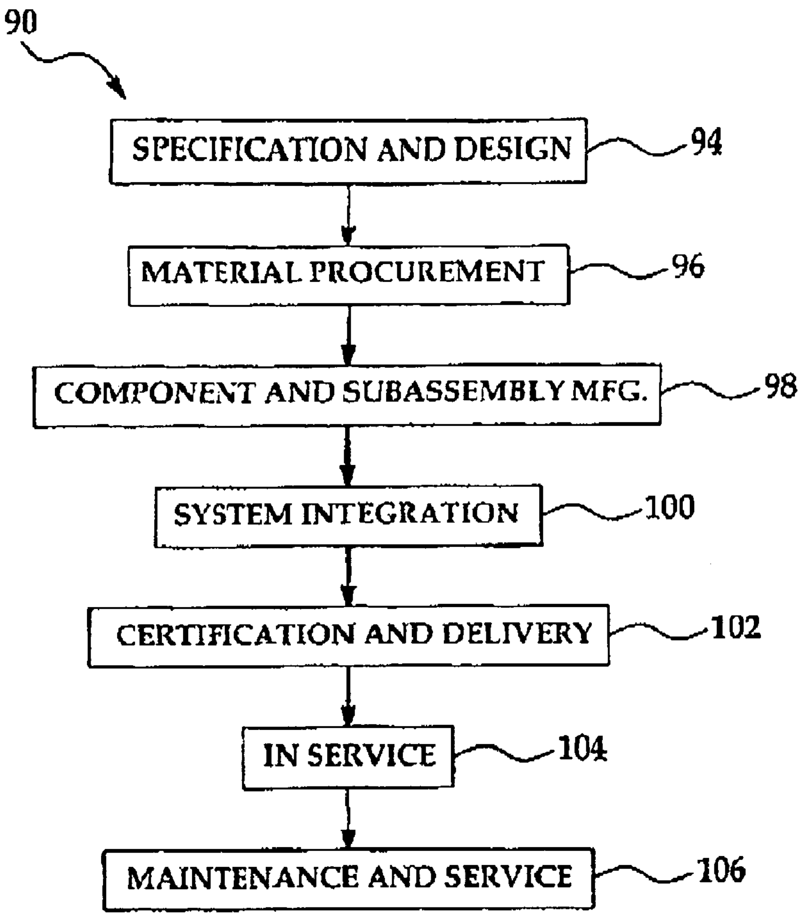
FIG. 5 is a flow diagram of aircraft production and service methodology.
Figure 6:
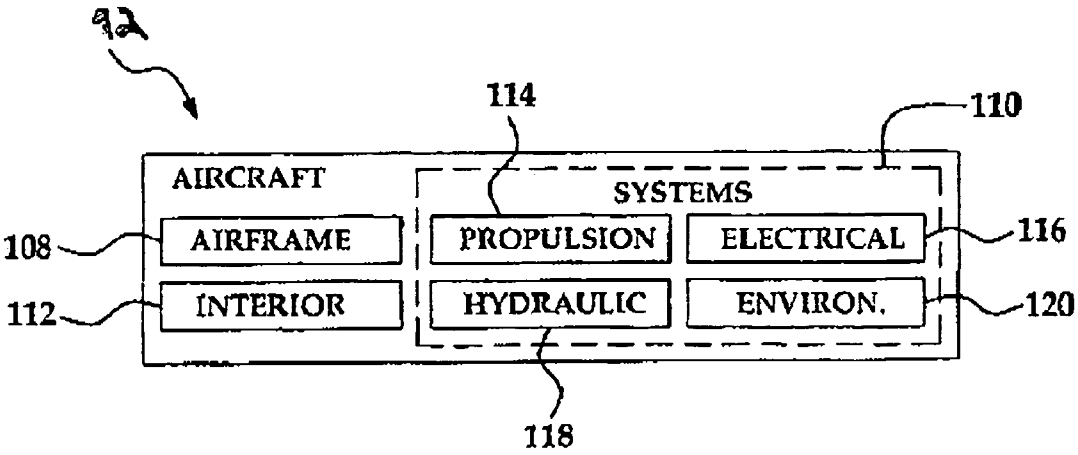
FIG. 6 is a block diagram of an aircraft.

Embodiments of the disclosure may find use in a variety of potential applications, particularly in the transportation industry, including for example, aerospace, marine and automotive applications. Thus, referring now to FIGS. 5 and 6, embodiments of the disclosure may be used in the context of an aircraft manufacturing and service method 90 as shown in FIG. 5 and an aircraft 92 as shown in FIG. 6. Aircraft applications of the disclosed embodiments may include, for example, without limitation, composite stiffened members such as fuselage skins, wing skins, control surfaces, hatches, floor panels, door panels, access panels and empennages, to name a few. During pre-production, exemplary method 90 may include specification and design 94 of the aircraft 92 and material procurement 96. During production, component and subassembly manufacturing 98 and system integration 100 of the aircraft 92 takes place. Thereafter, the aircraft 92 may go through certification and delivery 102 in order to be placed in service 104. While in service by a customer, the aircraft 92 is scheduled for routine maintenance and service 106 (which may also include modification, reconfiguration, refurbishment, and so on).

Each of the processes of method 90 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 6, the aircraft 92 produced by exemplary method 90 may include an airframe 108 with a plurality of systems 110 and an interior 112. Examples of high-level systems 110 include one or more of a propulsion system 114, an electrical system 116, a hydraulic system 118, and an environmental system 120. Any number of other systems may be included. Although an aerospace example is shown, the principles of the disclosure may be applied to other industries, such as the marine and automotive industries.

Systems and methods embodied herein may be employed during any one or more of the stages of the production and service method 90. For example, components or subassemblies corresponding to production process 90 may be fabricated or manufactured in a manner similar to components or subassemblies produced while the aircraft 92 is in service. Also, one or more apparatus embodiments, method embodiments, or a combination thereof may be utilized during the production stages 98 and 100, for example, by substantially expediting assembly of or reducing the cost of an aircraft 92. Similarly, one or more of apparatus embodiments, method embodiments, or a combination thereof may be utilized while the aircraft 92 is in service, for example and without limitation, to maintenance and service 106.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of cutting composite plies, comprising:

feeding an ultrasonic knife through the plies, said knife reciprocating substantially perpendicular with respect to a feed path of said knife through said plies to cut said plies, said knife moveable with resect to said material;

measuring at least one parameter related to the operation of the knife as the knife cuts the plies including a power load on a transducer to drive the knife and a side load imposed on said knife by said plies; and, generating a feed rate signal in response to said measurement to optimize the feed rate of the knife based on the measured parameter such that the plane of the knife is maintained substantially perpendicular to the planes of the plies.

2. The method of claim 1, wherein:

feeding the knife includes controlling the movement of the knife using an automatic controller, and, generating the feed rate signal is performed using the automatic controller.

3. The method of claim 1, wherein measuring the at least one parameter includes sensing at least one of:

said power load on an ultrasonic transducer used to drive the knife, a deflection of the knife, and a temperature of the knife.

4. The method of claim 1, further comprising:

feeding back the measured parameter to a controller, and wherein generating the feed rate signal is performed by the controller.

5. The method of claim 1, further comprising:

comparing the value of the measured parameter with a preselected value, and wherein generating the feed rate signal is based on the results of the comparison.

6. Composite plies for aircraft subassemblies cut by the method of claim 1.

7. A method of controlling the operation of an ultrasonic cutter while cutting material, comprising:

selecting a feed rate at which an ultrasonic knife is fed to cut said material, said knife reciprocating substantially perpendicular with respect to a feed path of said knife through said material to cut said material, said knife moveable with respect to said material;

measuring at least one parameter related to the operation of the knife as the knife cuts the material including a power load on a transducer to drive the knife and a side load imposed on said knife by said plies;

comparing the value of the measured parameter with a preselected value; and, determining whether to change the selected feed rate based on the results of the comparison to optimize the feed rate such that the plane of the knife is maintained substantially perpendicular to the planes of the plies.

8. The method of claim 7, further comprising:

changing the feed rate when it has been determined that the feed rate should be changed based on the results of the comparison.

9. The method of claim 8, wherein changing the feed rate is performed by an automatic controller, and the method further comprises:

feeding back the measured parameter to the automatic controller.

10. The method of claim 1, wherein said composite plies comprise an aircraft part.

11. The method of claim 7, wherein Measuring the parameter includes sensing at least one of:

an ultrasonic power load on the knife, a deflection of the knife, and a temperature of the knife.

12. The method of claim 7, further comprising:

controlling the movement of the knife using a first controller, and wherein comparing the measured parameter with the preselected value and changing the feed rate is performed by a second controller.

13. The method of claim 7, further comprising:

measuring a second parameter related to the operation of the knife as the knife cuts the material; and wherein determining whether to change the selected feed rate includes generating a feed rate control signal using the first and second measured parameters.

14. The method of claim 13, wherein:

measuring the at least one parameter includes sensing the side load on the knife, and measuring the second parameter includes sensing the ultrasonic power used to drive the knife.

15. A system for cutting material, comprising:

an ultrasonic powered knife for cutting the material, said knife reciprocating substantially perpendicular with respect to a feed path of said knife through said material to cut said material, said knife moveable with respect to said material;

control means for controlling the rate at which the knife is fed through the material;

sensing means for sensing at least one parameter related to the operation of the knife including a power load on a transducer to drive the knife and a side load imposed on said knife by said plies; and, a set of programmed instructions used by the control means for optimizing the feed rate of the knife based on the sensed parameter such that the plane of the knife is maintained substantially perpendicular to the planes of the plies.

16. The system of claim 15, wherein the sensing means includes:

a first sensor for sensing said power load, and a second sensor for sensing said side loads on the knife.

17. The system of claim 16, wherein the control means includes a controller for generating a commanded feed rate control signal based on the sensed side loads on the knife and ultrasonic power delivered to the knife.

18. The system of claim 15, wherein the control means includes:

a first controller for controlling the movement of the knife, and, a second controller for generating a control signal used by the first controller to optimize the feed rate of the knife.

19. A system for cutting plies of composite material, comprising:

an ultrasonic powered knife for cutting the material, said knife reciprocating substantially perpendicular with respect to a feed path of said knife through said material to cut said material, said knife moveable with respect to said material;

means for automatically feeding the knife through the composite material according to said feed path;

means for producing a first feedback signal related to ultrasonic power load delivered to the knife;

means for producing a second feedback signal related to a side load imposed on the knife by the composite material;

means for conditioning the first and second feedback signals; and, control means coupled with the feeding means for optimizing the rate at which the knife is fed though the composite material based on the first and second feedback signals such that the plane of the knife is maintained substantially perpendicular to the planes of the plies.

20. The system of claim 19, wherein the means for producing the first feedback signal includes a sensor for sensing ultrasonic power load delivered to the knife.

21. The system of claim 19, wherein the control means includes a computer operated by programmed instructions implementing an adaptive control algorithm.

22. The system of claim 19, wherein the automatic feeding means includes a CNC controller coupled with the knife feeding means and the control means.

23. The system of claim 19, further comprising a user interface for allowing a user to input set-up values used by the control means for optimizing the feed rate of the knife.

24. A system for cutting plies of composite material, comprising:

an ultrasonic powered knife for cutting the plies, said knife reciprocating substantially perpendicular with respect to a feed path of said knife through said plies to cut said plies, said knife moveable with resect to said material;

a machine tool for feeding the knife along a programmed path through the plies, said programmed path comprising said feed path;

an NC controller for controlling the operation of the machine tool and the operation of the knife;

a first sensor for sensing a power load delivered to the knife;

a second sensor for sensing a side load imposed on the knife by the composite material;

a signal conditioner for conditioning signals produced by the first and second sensors; and, a computer coupled with the NC controller and the signal conditioner for generating a feed rate adjustment signal used to optimize the feed rate of the knife based on the sensed power delivered to the knife and the sensed side load on the knife such that the plane of the knife is maintained substantially perpendicular to the planes of the plies.

25. A method of controlling the operation of an ultrasonic cutter used to cut plies of composite material, comprising:

generating a set of programmed instructions for controlling the operation of an ultrasonic knife used to cut the plies, including a path along which the knife is fed and the rate at which the knife is fed through the plies, said knife reciprocating substantially perpendicular with respect to said feed path of said knife through said plies to cut said plies, said knife moveable with respect to said material;

feeding the knife through the plies along the path and at a feed rate determined by the programmed instructions;

measuring a side load imposed on the knife by the plies as the knife cuts the plies;

measuring the power load required by the knife to cut the plies;

comparing the measured side load and the measured power load with reference values;

generating a feed rate signal based on the results of the comparisons with the reference values; and, optimizing the feed rate of the knife using the feed rate signal such that the plane of the knife is maintained substantially perpendicular to the planes of the plies.

* * * * *